Jan. 2, 1951          A. HANSEN, JR          2,536,805
HALL EFFECT TELEMETERING TRANSMITTER
Filed Aug. 16, 1947          2 Sheets-Sheet 1
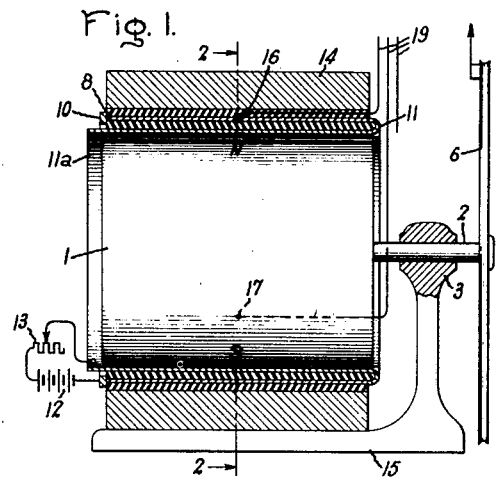
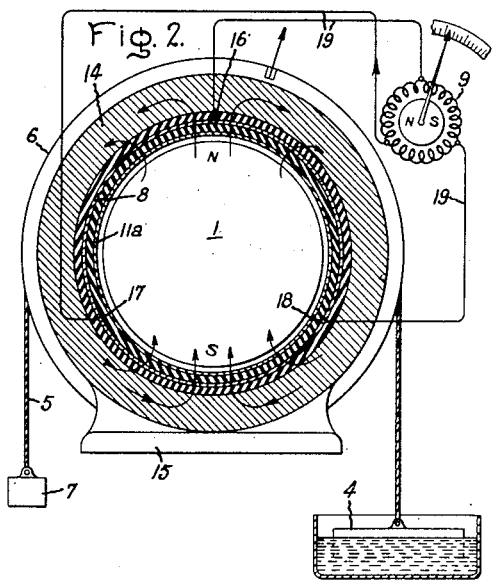
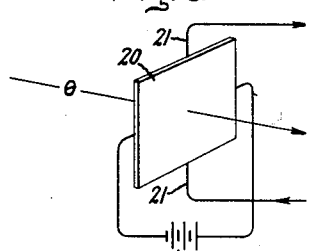
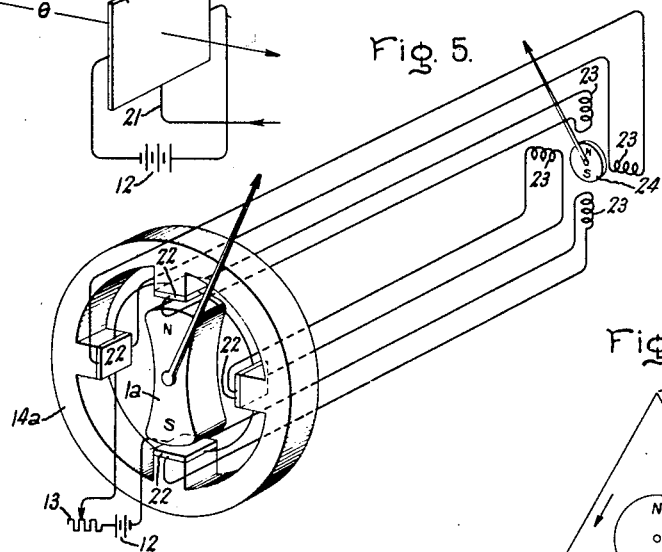
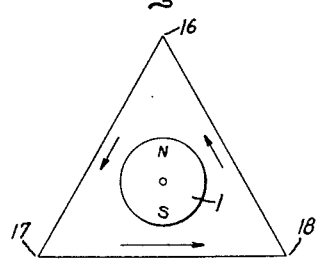
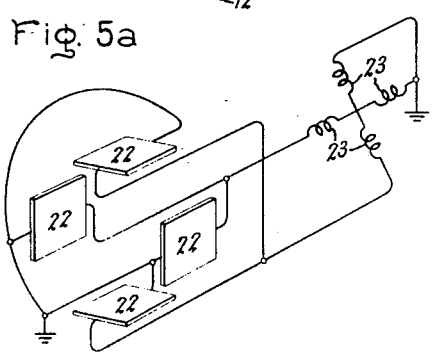
Inventor:
Albert Hansen Jr.,
by *Prowell F. Mach*
His Attorney.

Jan. 2, 1951          A. HANSEN, JR          2,536,805
               HALL EFFECT TELEMETERING TRANSMITTER
Filed Aug. 16, 1947                          2 Sheets-Sheet 2

Inventor:
Albert Hansen Jr.,
by Browell S. Mack
His Attorney.

Patented Jan. 2, 1951

2,536,805

UNITED STATES PATENT OFFICE 2,536,805

HALL EFFECT TELEMETERING TRANSMITTER

Albert Hansen, Jr., Nahant, Mass., assignor to General Electric Company, a corporation of New York Application August 16, 1947, Serial No. 768,983

10 Claims. (Cl. 177—380)

My invention relates to a transmitter for transmitting electric signals corresponding to linear or rotary motion suitable for energizing a remote electrical receiver for producing an indication corresponding to such motion. In carrying my invention into effect, I employ a transmitter generator utilizing the Hall effect which enables the construction of low-cost reliable transmitters which do not require the use of moving contacts.

Figure 6:
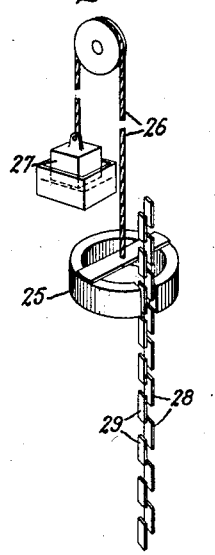
Figure 7:
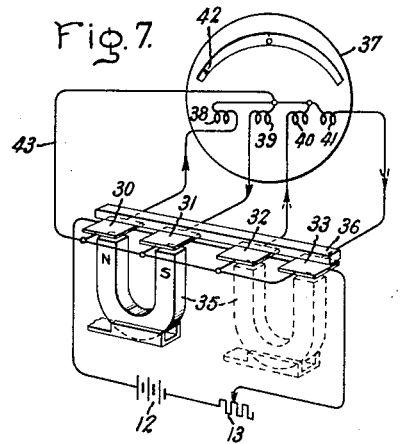
Figure 8:
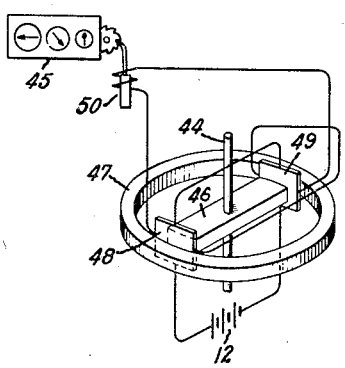
Figure 9:
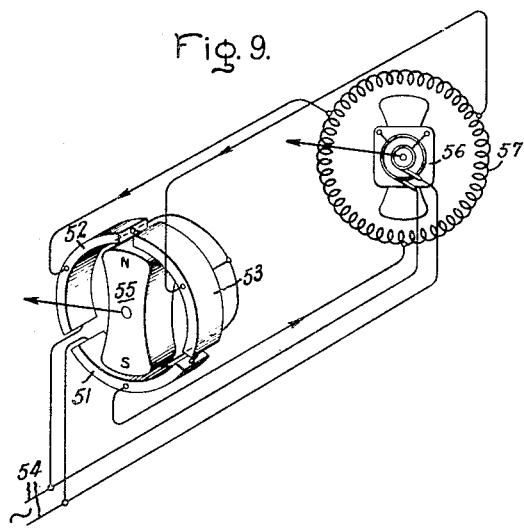

The features of my invention which are believed to be novel and patentable will be pointed out in the claims appended hereto. For a better understanding of my invention, reference is made in the following description to the accompanying drawing in which Fig. 1 represents a cross-sectional view of one embodiment of my vention employing a rotary permanent magnet within a Hall effect cylinder. Fig. 2 is a partially sectioned end view of the apparatus of Fig. 1 and includes the electrical connections to a remote receiver. Figs. 3 and 4 are diagrams explanatory of the Hall effect and its application to Fig. 2. Fig. 5 represents a transmitter in which individual Hall plates are used. Fig. 5a represents a parallel series connection of the system of Fig. 5. Fig. 6 represents an embodiment of my invention where the relative motion between the field and Hall plates is linear. Fig. 7 is another linear motion transmitter with differential connections to a zero center type of direct current measuring instrument, and Fig. 8 shows the application of my invention as a revolution counter, and Fig. 9 represents an alternating current telemetering system embodying my invention.

Referring now to Figs. 1 and 2, 1 represents a cylindrical permanent magnet polarized across a diameter as indicated by N and S. This magnet is on a shaft 2 rotatively mounted in a bearing 3 and adapted to be rotated in accordance with the motion to be transmitted, in this case a fluid level float 4. The linear up-and-down motion of the float is converted to rotary motion of shaft 2 by a cable 5 attached to the float and running over a pulley 6 secured on shaft 2 and held tight in driving relation with the pulley by a weight 7.

Concentrically surrounding the permanent magnet 1 and separated therefrom by a relatively small air gap or its equivalent is a thin-walled stationary cylinder 8 made of a material such as germanium or tellurium which has a high Hall constant. It will be assumed that the cylinder 8 is made of germanium, as this will require no amplification in the output or secondary circuit leading to the receiver at 9. The cylinder 8 has secured thereto ring-shaped end conductors 10 and 11 which may be made of copper. The conductor 11 may be part of or is secured to a copper cylinder 11a concentrically inserted within cylinder 8. These conductors permit the Hall cylinder 8 to be connected in a direct current circuit supplied from a source 12 with a rheostat 13 in the circuit for adjusting the value of the current. The connections to the conductors 10 and 11a are thus made at the same end of the transmitter, although the current through the Hall cylinder 8 is axially from one end to the other. This arrangement permits the copper cylinder 11a to be used as a damping means in cooperation with the polarized rotor 1, since, when the rotor is turned, eddy currents will be produced in the copper cylinder 11a. More important, however, is the fact that the current from source 12 which flows axially in one direction in the Hall cylinder 8 also returns axially in the opposite direction closely adjacent to the Hall cylinder, and this direct current circuit is, therefore, noninductive with respect to the field produced by polarized rotor 1, and no motor or generator action can be produced between such field and current when the rotor is turned. The current distribution from source 12 in the Hall cylinder 8 and the return circuit cylinder 11a is uniform throughout such cylinders. This is the primary or input circuit in which the primary current flows in parallel in the three Hall effect elements making up cylinder 8. Surrounding the cylinder 8 is a hollow cylinder of magnetic material 14 better to cause the flux of the permanent magnet 1 to pass through the Hall cylinder and to provide a return path for the flux of the permanent magnet external to the cylinder 8. Thus it is evident that the flux of the permanent magnet will pass from its north pole through the wall of cylinder 8 into outer magnetic yoke 14 and return to a position opposite the south pole of the magnet and there return through the wall of cylinder 8 to the magnet generally as indicated by the arrow lines in Fig. 2. The cylinders 8 and 11a may be held in place in the yoke 14 by providing thin walls of insulation between the interior of the yoke and the external surface of the cylinder 8 and between cylinders 8 and 11a as represented. The yoke 14 may be supported in proper relation to bearing pedestal 3 by a common supporting base 15.

Secondary output terminals 16, 17, and 18 are connected to the surface of the Hall cylinder 8 at three equally spaced points about such cylinder and midway between the ends thereof in a three-phase fashion. These connections are of course insulated from the yoke 14 and lead over a three-wire circuit 19 to a remote receiver 9 as represented in Fig. 2. The receiver may be a conventional, three-coil stator, polarized rotor receiver such as is described in United States Letters Patent 2,248,616 to Faus, July 8, 1941, assigned to the same assignee as the present invention. Applicant's transmitter performs the same function as the transmitter shown in Fig. 1 of such Faus patent in transmitting direct current to the receiver but does so without moving contacts and utilizes a different principle.

The simple Hall effect is represented in Fig. 3, where a Hall plate 20 is placed at right angles to and in a unidirectional flux field $\phi$. A primary direct current is conducted through the plate from end to end from a source 12, and a direct current voltage will appear across the other edges of the plate at points 21. The voltage across points 21 is proportional to the field $\phi$ and the current from source 12 and to the Hall constant of the plate. Its polarity will reverse with reversal of the field or primary current. Generally, the plate should be as thin as its mechanical strength will allow. The amount of current that may be drawn from the terminals 12 will depend upon the resistivity of the plate material. I have found that germanium has the Hall constant, mechanical strength and resistivity suitable for my purposes.

In Figs. 1 and 2 the cylinder 8 may be considered to comprise three Hall plates or members arranged in a circular row and connected in delta as represented in Fig. 4, energized in multiple by the primary current and all acted upon by a common field flux but at different angles depending on the angular position of the rotor. Thus, that section of the cylinder 8 between terminals 16 and 17 constitutes a Hall effect member, and may be a separate sector of the cylinder if desired. As the rotor turns, the flux values which cut the three plates represented in Fig. 4 will rise and fall and reverse in a progressive relation in the direction of field rotation. If the rotor is turned at 3600 R. P. M., a 60-cycle three-phase alternating current voltage would appear at the three terminals just as if they were the terminals of a two-pole, 60-cycle alternating current generator. However, applicant's device is unlike a three-phase generator in the following respect. If a three-phase generator is slowed down from synchronous speed to standstill, its frequency and voltage would both decrease with decrease in speed and the voltage would be zero at standstill. In my device the slowing down to standstill decreases the frequency but not the voltage and at standstill the three-phase voltages become direct current voltages with a three-phase distribution depending on rotor position. Thus the arrows in Fig. 4 may represent the direct current voltages across the secondary terminals for the rotor position represented in Fig. 2. That section of cylinder 8 between terminals 17 and 18 is cut by the maximum flux, while those sections between terminals 16 and 18 and 16 and 17 are each cut by about one-half the maximum flux. Owing to the delta connection, terminal 16 will have a voltage midway between that existing between terminals 17 and 18, and hence, when these terminals are connected to a receiver wound three-phase fashion as represented in Fig. 2, current will flow to the receiver between terminals 17 and 18 and none will flow in the wire connected to terminals 16 for the particular position of rotor 1 represented. The polarized receiver rotor will thus line up with the horizontal field produced in the receiver for the condition assumed and represented. It is apparent that applicant's Hall effect transmitter will perform the same function as does the resistance transmitter of Fig. 1 of the previously mentioned Faus patent, and that the receiver rotor will follow precisely the rotary movements of the transmitter rotor. Using germanium for the Hall cylinder in Figs. 1 and 2, no amplification between the transmitter and receiver is required for medium distances and a one-receiver load. A field density of the order of 5,000 gauss and a primary current of the order of .050 ampere for a germanium cylinder 8, one inch in diameter and one inch long and of the order of .050 inch in thickness, are recommended.

It will be apparent that the transmitter described is like a three-phase generator in the respect that it may be arranged to have any desired number of phases and pairs of poles.

It will be evident that the invention may be embodied in a variety of forms as will be briefly explained. In Fig. 5, I have represented a telemetering system in which a transmitter having four individual Hall plates 22 are used across the faces of the four stator pole pieces. These plates are connected in series primary to a direct current supply 12. The stator 14a and polarized rotor 1a correspond to the stator 14 and polarized rotor 1 of Figs. 1 and 2. The receiver has four stationary windings 23 and a polarized rotor 24. The four stator windings are individually connected to the four Hall plates of the transmitter. Connected as illustrated the receiver will rotate in the opposite direction to the transmitter. It will be evident that in Fig. 5 the transmitter produces four individual direct current voltages each one of which rises and falls and reverses in direction once per revolution of the rotor, and that the voltages will occur simultaneously but in reversed directions in diametrically opposite pairs of Hall plates and will alternate with the voltages in the other pair of plates.

If the distance between transmitter and receiver is appreciable, the opposite pairs of Hall plates in the transmitter and the opposite pair of coils in the receiver could be connected in parallel in the proper direction to a single pair of connecting wires. This would reduce the number of connecting wires to four. It is also possible to ground one terminal of each Hall plate and one terminal of each receiver winding and reduce the number of connecting wires to four. Finally, a combination of such connections could be used to reduce the connecting wires to two with ground return. The opposite pairs of Hall plates in the transmitter or the opposite pairs of coils in the receiver, or both, could be connected in parallel or in series in the proper directions. Fig. 5a represents the system of Fig. 5 reconnected for two-wire transmission with ground return and with opposite pairs of Hall plates in parallel and opposite pairs of coils in series.

In Fig. 6 there is indicated a transmitter embodying my invention in which the relative motion between the magnet field and Hall plates is linear. The magnet 25 is represented as being mounted on and moved by the cable 26 of a liquid level transmitter operated by the float 27.

The Hall plates are mounted so as to progressively intercept the flux field in the air gap of magnet 25 as the level changes. A single or multiple row of such Hall plates may be used and when a multiple row is used, the plates in the different rows may be in line or overlapping in any desired fashion and connected to the same or different receivers. Two rows 28 and 29 of Hall plates in overlapping relation are represented in Fig. 6. The linear spacing of the Hall plates may vary and any desired arrangement of connections may be employed to obtain a wide variety of results. As represented, the plates are more closely spaced at the upper end of the rows. This can be used to amplify low liquid level readings.

In Fig. 7, I have represented another linear motion Hall effect transmitter using four Hall plates 30, 31, 32, and 33 in a row and energized in series from the primary source 12. Thirty-five (35) represents a U-shaped permanent magnet assumed to have a range of movement from the position shown in full lines to that shown in dotted lines. Thirty-six (36) is a bar of magnetic material on the opposite side of the row of plates from magnet 35 to provide good flux density through the Hall plates adjacent the magnet. The secondary circuits of the Hall plates are connected to a zero center type of direct current measuring instrument 37. Four equal instrument coil sections 38, 39, 40, and 41 are shown. These sections could be considered as one coil in an instrument energized from a single source of reversible direct current. The instrument is of that type where the pointer 42 is at the center of the scale for zero energization and deflects in one direction from center for one direction of direct current energization and in the opposite direction when the energizing current reverses. The deflection from zero center is proportional to the energizing current. Such instruments with single energizing coils are commonly used on automobile battery circuits.

In the present case the four coil sections 38, 39, 40, and 41 are individually connected to the four Hall plates 30, 31, 32 and 33 with a common return wire 43 as shown. The end coil sections 38 and 41 are connected to their Hall plates in one direction, while the inner coil sections 39 and 40 are connected to their Hall plates in the reverse direction. The coil sections may be wound one over the other and it is assumed that if current were flowing in the same direction in all sections, their fluxes would be in the same direction. It is evident that the fluxes through the Hall plates opposite the two poles of the magnet 35 will be in opposite directions, and hence, the secondary output currents will flow in opposite directions. Thus, for the full line position of magnet 35 represented, Hall plate 30 will produce a secondary current as represented by the full line arrow on its connection to coil section 38 and flow to the left in such section. Hall plate 31 produces a current in the reverse direction in its lead as indicated by the full line arrow thereon, but its coil section is connected also to produce current flow to the left. Thus the fluxes of coil sections 38 and 39 produce an instrument deflection to the left end of the instrument scale. As the magnet is moved to the right, the fluxes produced in Hall plates 30 and 31 will decrease and their currents will decrease. As the south pole of the magnet approaches plate 32, current will build up therein and flow in coil section 40, and as the north pole of the magnet approaches Hall plate 31, the current produced thereby will pass through zero and build up in the reverse direction, so that when the magnet is in center position directly opposite plates 31 and 32, plate 31 will produce a current to the right in its coil section 39 and plate 32 will produce a current to the left in its coil section 40. These differential coil section fluxes will cancel and the instrument pointer will be at the center of the scale.

In the extreme right position of the magnet 35 represented by dotted lines, Hall plates 32 and 33 will produce currents as represented by dotted line arrows on the coil section connections producing current flow and fluxes in their coil sections to the right and an instrument pointer deflection to the extreme right of the scale. Thus, as the magnet is moved to the right over the range of its travel, the pointer 42 deflects to the right over its scale range. By properly positioning the Hall plates, the relation between these movements may be made linear and smooth. One might inquire why not use a single coil in the instrument 37 and connect all the Hall plates thereto in parallel as opposite Hall plates are connected in Fig. 5a. In Fig. 5a the voltage produced by the parallel connected Hall plates are always equal. However, in Fig. 7, the voltages of all of the several Hall plates vary relative to each other and if a parallel connection were used, one Hall plate would tend to send a portion of its current through another Hall plate instead of through the coil and the efficiency would be poor.

In Fig. 8, I have represented the application of my invention to a revolution counter. In this figure 44 may represent the shaft of an integrating meter the revolutions of which it is desired to count on a register 45 at a remote point. On shaft 44 and rotating therewith is a permanent magnet 46. The poles of this magnet rotate close to and within a smooth ring 47 of magnetic material which provides a uniform reluctance flux return path for the magnet 46 in all rotary positions of such magnet. Hence, it does not produce any locking action on the meter shaft. If desired, the inner face of the ring may be copper plated and serve to provide damping for the meter. At least at one point and preferably at two diametrically opposite points, there are provided Hall plates 48 and 49 positioned to be cut by the flux of the permanent magnet as it crosses to and from ring 47 when the ends of such magnet pass adjacent such plates. The plates are energized in series from a primary source 12 and their secondaries are connected in series or parallel, so that their voltages or currents will add in a telemetering circuit containing a relay 50. The relay is arranged to operate a ratchet wheel which drives the register 45. Thus, for each one-half revolution of the meter shaft 44, the relay 50 will receive an impulse sufficient for its operation, and the register 45 will be advanced accordingly. Alternate impulses will be in a reverse direction but this is immaterial so far as operation of the relay is concerned. The duration but not the amplitude of such current impulses will vary with the meter speed. The precautions to be observed are to see to it that the relay is sufficiently sensitive to operate satisfactorily when the meter operates at maximum speed, and that such relay is not damaged by continuous energization in case the meter should stop with the magnet 46 in alignment with the Hall plates. The primary direct current circuit will preferably be made noninductive with respect to the magnet field of the rotor as explained in connection with Fig. 1.

I have thus far described my Hall effect transmitter as being energized by primary direct current. This is generally desirable because it avoids the use of slip rings in both the transmitter and the receiver. However, an alternating current source of primary energization may be used in the Hall effect elements of the transmitter and this is represented in Fig. 9. The Hall effect members 51, 52, and 53 of the transmitter are energized in primary series from the A.-C. source 54 and their secondary output terminals are connected in three-phase Y fashion to the three-phase delta-connected stator winding 57 of the receiver. A permanent magnet field member 55 is used in the transmitter. The Hall effect voltages produced will be alternating current voltages with a relative magnitude depending on rotor position. Thus in Fig. 9 plate 51 will be producing maximum voltage and the A.-C. current distribution in the system will be as represented by the arrows.

The rotor of the receiver could be a plain bipolar nonpolarized magnetic piece but in this case it could line up with the stator field in positions 180 degrees apart. Hence, it is preferably provided with an A.-C. winding 56 energized from the single-phase source 54, and hence, is phase sensitive to the stator current and will follow the transmitter rotor precisely. It is evident that the A.-C. system of Fig. 9 will permit the use of a step-up transformer and A.-C. amplification in the telemetering circuit.

In all of the modifications described it is to be noted that the usual voltage variations to be expected in the source of supply and also in frequency in Fig. 9 will have no effect upon accuracy.

The movable member of the transmitter may, of course, be moved in accordance with any kind of measurement or motion desired and while the Hall plates instead of the field could be the movable member, this would generally be undesirable because of the electrical connections to such plates.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A telemetering transmitter comprising a plurality of Hall effect members, means relatively movable with respect to and adjacent to said members for producing a magnetic field therethrough such that the fluxes through said members rise and fall progressively in accordance with such relative movement, a device the motion of which is to be transmitted for producing such relative movement, a source of supply and connections therefrom to said members for causing primary current flow through said members, the directions of flux and current through said members being such as to produce the Hall effect in such members which effect varies progressively from member to member in a predetermined manner with such relative movement, and secondary output terminals for said members whereby they may be connected as a telemetering transmitter to a distant receiver.

2. A telemetering transmitter comprising a plurality of Hall effect members arranged in a row, a permanent magnet having pole pieces of opposite magnetic polarity movable adjacent to and along said row such that fluxes are produced through said members from said pole pieces in a progressive fashion as said pole pieces are moved along said row, the flux through a given member rising and falling and reversing as the magnet pole pieces are moved past the same in a given direction, a source of supply and connections therefrom to said members for producing primary current in said members, the directions of flux and current through said members being such as to produce the Hall effect therein, and secondary output terminals for said members whereby they may be connected as a transmitter to a telemetering circuit.

3. In a telemetering transmitter, a transmitter element for producing a variable telemetering current signal without moving contacts, comprising a stationary Hall effect member and a permanent magnet having north and south pole pieces movably arranged adjacent said member to cause either its north pole or south pole flux to pass through said member, means for supplying said member with primary current, the directions of flux and current flow through such member being such as to produce the Hall effect therein, and secondary output terminals connected to said stationary member so as to be energized by the Hall effect thereof.

4. A telemetering transmitter comprising a plurality of stationary Hall effect members arranged in a circular row about an axis of rotation, a permanent magnet field member rotatively mounted on said axis of rotation with north and south poles evenly spaced and adjacent to said row of members such that when the field member is rotated fluxes are progressively produced through said members, the flux through a given member rising and falling and reversing as north and south poles of the field member are moved therepast in a given direction, a source of supply and connections therefrom to said members for passing primary current through all of said members, the directions of flux and primary current through said members being such as to produce the Hall effect therein, and secondary output terminals for said members positioned to be energized by the Hall effect voltages of said members.

5. A telemetering transmitter comprising a thin cylinder of Hall effect material mounted stationary and concentric with respect to an axis of rotation, said cylinder having three secondary output terminals equally spaced apart about the cylinder, a two-pole permanent magnet within said cylinder mounted for rotation on said axis of rotation with its pole pieces uniformly spaced apart and closely adjacent the wall of the cylinder so as to produce fluxes therethrough in opposite radial directions at diametrically opposite points, conductors at the ends of said cylinders and connections from said conductors to a source of supply for passing primary current axially through the cylinder, and a member of magnetic material concentric with the cylinder and exterior thereto for providing a flux return path for the permanent magnet and directing its flux through the walls of said cylinder.

6. In a telemetering transmitter a magnetic circuit containing an air gap, means in said circuit for producing a magnetic field across said gap, a plurality of stationary rows of Hall effect members positioned in alignment with said air gap with the Hall plates in different rows in staggered overlapping relation, at least a portion of said magnetic circuit being movable so as to cause different Hall effect members in said rows to intercept the flux crossing such gap, a source of supply, connections therefrom to said Hall effect members for producing primary current flow in said Hall effect members, and secondary output terminals positioned on said Hall members to be energized by the Hall effect voltage produced by said members, said Hall members being relatively thin in the direction of flux flow therethrough such that a plurality of them may be contained in a relatively narrow air gap and to be simultaneously cut by the same flux in series relation.

7. In a Hall effect telemetering transmitter a plurality of stationary rows of Hall effect members, movable means for producing a flux through such rows of members and progressively varying the value of such flux along such rows to produce Hall effect telemetering signals, the members in the different rows being staggered and the members in the same rows having a nonuniform spacing.

8. In a telemetering system a rotary shaft and means for transmitting current impulses at a rate proportional to the speed of rotation of said shaft comprising a permanent magnet mounted on said shaft, a ring of magnetic material concentric with said shaft and separated from the path of rotation of the pole pieces of said magnet by a narrow air gap, said ring serving as a flux return path between the poles of said magnet, a pair of Hall effect members inserted in said gap so as to be cut by the flux passing from said magnet to said ring and returning to said magnet simultaneously twice per revolution of said shaft, a source of supply and connections therefrom to said members for producing primary energizing current flow in such members, and secondary output terminals positioned on said members so as to be energized in response to the Hall effect voltages produced therein, said terminals being connected to a common impulse circuit in such directions as to obtain the accumulative effect of both Hall members in the production of current impulses.

9. A signal transmitter comprising a hollow magnetic stator member and a polarized rotor mounted for rotation within the stator member, the stator providing a return path for the flux of the polarized rotor between its magnetic poles, a stationary Hall effect member mounted within said stator so as to intercept the rotor flux passing between the stator and rotor, and means whereby primary current may be passed through said Hall effect member in a direction axially of the rotor comprising terminals at the axially opposite ends of the Hall effect member and connections to such terminals for including the Hall effect member in series relation in an electric circuit, one of said connections extending through the stator closely adjacent to the Hall effect member and outside the path of rotation of the rotor whereby current flow in said circuit is substantially noninductive with respect to the rotor flux.

10. A signal transmitter comprising a hollow magnetic stator, a polarized rotor mounted for rotation within said stator such that the stator provides a return path for the flux between the magnetic poles of the rotor, a stationary Hall effect member positioned within said stator and between it and the rotor so as to intercept the flux passing between the stator and rotor, and a thin cylinder of conducting material extending through said stator between the Hall effect member and rotor and electrically connected at one end to the corresponding end of the Hall effect member, said cylinder serving both as an eddy current damping member for the polarized rotor and as one of the circuit connections to said Hall effect member for passing current axially therethrough noninductively with respect to the rotor flux.

ALBERT HANSEN, JR.

REFERENCES CITED

The following references are of record in the file of this patent:

UNITED STATES PATENTS

| Number | Name | Date |
|---|---|---|
| 1,998,952 | Edgar et al. | Apr. 23, 1935 |
| 2,251,900 | Smith | Aug. 5, 1941 |
| 2,365,430 | Naul | Dec. 19, 1944 |
| 2,415,985 | Bechberger | Feb. 18, 1947 |

FOREIGN PATENTS

| Number | Country | Date |
|---|---|---|
| 409,318 | Germany | Feb. 4, 1925 |